3,554,957
SOLVENT SYSTEMS FOR COPOLYMERS OF ETHYLENE AND ACRYLIC ACID
Edgar John Van Tilburg, North Olmsted, Ohio, assignor to The Dow Chemical Company, Midland, Mich., a corporation of Delaware
No Drawing. Filed Jan. 11, 1968, Ser. No. 697,003
Int. Cl. C08f 45/34
U.S. Cl. 260—30.4                    6 Claims

ABSTRACT OF THE DISCLOSURE

A solvent system for copolymers of ethylene and acrylic acid characterized in that the copolymer will remain dissolved at substantially normal room temperature comprising between about 55 and about 65 percent by weight toluene, based upon the total weight of the solvent blend, and between about 35 and about 45 percent by weight tetrahydrofuran, based upon the total weight of the solvent blend. The copolymer can be dissolved and held in solution at normal room temperature in amounts up to about 5 percent by weight based upon the total weight of the solution.

---

This invention relates to solvents for polymeric materials. In one aspect, this invention relates to solvent systems for copolymers of ethylene and acrylic acid. In another aspect, this invention relates to solvent systems which will hold such copolymers in solution at normal room temperature.

Some of the factors which govern the selection of a solvent or a solvent system for a particular solute material include the solubility of the solute, the effects which a change in temperature may have on the solution, compatibility or adaptability of the solution as a component in a series of work performing operations, and the manner and purpose for which the solution is to be utilized. The determination of a suitable solvent for a particular situation is sometimes a difficult task because degrees of solubility can not always be predicted for various materials, especially when binary solvent systems are employed. In the case of copolymers of ethylene and acrylic acid, desirable concentrations of the copolymer cannot be attained in the more popular solvents without maintaining the solution at an elevated temperature. Moreover, with certain solvents, such as tetrahydrofuran, the copolymers of ethylene and acrylic acid are only slightly soluble even at temperatures as great as 150° F. Since this temperature is the approximate boiling point of tetrahydrofuran, it is obviously unsuitable for use as a solvent for ethylene-acrylic acid copolymers.

In accordance with this invention, it has now been discovered that graft or random copolymers of ethylene and acrylic acid can be dissolved and maintained in solution at normal room temperature.

Accordingly, it is an object of this invention to provide a solvent system for copolymers of ethylene and acrylic acid at normal room temperature. Another object of this invention is to provide a solution containing a dissolved copolymer of ethylene and acrylic acid which can be applied or deposited at substantially normal room temperature. These and other objects of the invention will become apparent to one skilled in the art after studying the following detailed description and the appended claims.

In the practice of this invention, a normally solid copolymer of ethylene and acrylic acid is dissolved and maintained in solution at substantially normal room temperature by means of a solvent system comprising a solvent blend of between about 55 and about 65 percent by weight toluene, based upon the total weight of the solvent blend, and between about 35 and about 45 percent by weight tetrahydrofuran, based upon the total weight of the solvent blend. The ethylene-acrylic acid copolymer contains at least about 75 percent by weight combined ethylene, based upon the total weight of the copolymer, and up to about 25 percent by weight combined acrylic acid, based upon the total weight of the copolymer. A more preferred range for the components in the copolymer is between about 92 and about 99.5 percent combined ethylene, based upon the total weight of the copolymer, and between about 0.5 and about 8 percent by weight combined acrylic acid, based upon the total weight of the copolymer.

Both random and graft copolymers can be dissolved and maintained in solution by the solvent system of this invention. While the invention is not predicated upon any particular technique for preparing the copolymers, graft copolymers which can be dissolved in the solvent of this invention can be prepared by the methods outlined in U.S. Patents 3,177,269 and 3,270,090, the disclosures of which are specifically incorporated herein by reference. An exemplary technique for producing random copolymers which can be dissolved by the solvent system of this invention involves subjecting a mixture of ethylene and acrylic acid to a high pressure such as between about 500 and about 1000 atmospheres and to an elevated temperature such as between about 100° and about 400° C. in the presence of a suitable free radical initiator such as lauroyl peroxide, ditertiary butyl peroxide, or $\alpha,\alpha$-azobis-diisobutyronitrile. Reaction conditions can be varied to produce random copolymers of the desired molecular weight.

In accordance with this invention, it has been discovered that as a general proposition when the acrylic acid content of the copolymer increases the percent of the copolymer which can be dissolved and maintained in solution at normal room temperature also increases. Thus, up to about 5 percent by weight of a random or graft copolymer containing about 25 percent by weight combined acrylic acid can be maintained in the solvent of this invention at normal room temperature. For copolymers containing between about 92 and about 99.5 percent by weight combined ethylene and between 0.5 and about 8 percent by weight combined acrylic acid, up to about 1 percent by weight of the copolymer can be maintained in solution at normal room temperature.

In a preferred embodiment of the invention, the solvent blend comprises about 60 percent by weight toluene, based upon the total weight of the solvent blend, and about 40 percent by weight tetrahydrofuran, based upon the total weight of the solvent blend. In this embodiment, up to about 1 percent by weight of a copolymer containing about 92 percent by weight ethylene and about 8 percent by weight combined acrylic acid is dissolved and maintained in solution in the solvent blend at normal room temperature.

The following examples will serve to illustrate the improved results obtained by this invention. It must be understood that such examples are for the purpose of illustration only and are not to be considered limiting of the invention.

EXAMPLE I

A solvent blend comprising 40 parts by weight tetrahydrofuran and 60 parts by weight toluene was prepared by blending the materials in a vessel under slight heating to raise the temperature of the blend to 90° F. One part by weight of a random copolymer containing 92 percent by weight ethylene and 8 percent by weight acrylic acid, in the form of molding granules was added to the vessel and the mixture was agitated until the resin dissolved. The resulting solution was allowed to cool to room temperatrue and it was observed that none of the copolymer precipitated out of solution.

In a control run, a vessel containing 100 parts by weight of toluene was charged with one part by weight of a copolymer of 92 percent by weight ethylene and 8 percent by weight acrylic acid (the same kind of copolymer granules as used in Example I). The toluene copolymer mixture was heated to a temperature of 150° F. whereupon it was observed that the copolymer was only slightly soluble. Upon cooling, the copolymer precipitated out and formed a gel.

In another control run, 100 parts by weight of tetrahydrofuran was charged with one part by weight of a copolymer of 92 percent by weight ethylene and 8 percent by weight acrylic acid (the same kind of copolymer granules as used in Example I) and heated to a temperature of about 150° F. Again, the copolymer was only slightly soluble and a gel formed when the tetrahydrofuran was cooled to a temperature just slightly below 150° F. Of course, the tetrahydrofuran began to boil away and vaporize at about 150° F.

EXAMPLE II

A solvent blend is prepared by charging 55 parts by weight toluene and 45 parts by weight tetrahydrofuran to a vessel. About 5 parts by weight of a copolymer of about 75 percent by weight combined ethylene and about 25 percent by weight combined acrylic acid is charged to the vessel. The vessel is heated to a temperature of about 140° F. whereupon the copolymer dissolves. Upon cooling to room temperature, the copolymer remains dissolved in the solvent blend.

EXAMPLE III

Another run is conducted in substantially the same manner as that described in connection with Example II except that the copolymer comprises about 86.5 percent by weight ethylene and about 13.5 percent by weight acrylic acid. After dissolving the copolymer in the solvent blend by the application of heat, the vessel is allowed to cool to normal room temperature and the copolymer remains in solution.

Although the invention has been described in considerable detail, it must be understood that such detail is for the purpose of illustration only and must not be considered limiting of the invention.

I claim:

1. A solution characterized in that a dissolved solute remains dissolved at substantially normal room temperature, said solution comprising a solvent blend of between about 55 and about 65 percent by weight toluene, based upon the total weight of the solvent blend, and between about 35 and about 45 percent by weight tetrahydrofuran, based upon the total weight of the solvent blend, and up to about 5 percent by weight, based upon the total weight of said solution, of a copolymer of between about 75 and about 99.5 percent by weight of combined ethylene, based upon the total weight of the copolymer, and between about 0.5 and about 25 percent by weight combined acrylic acid, based upon the total weight of the copolymer.

2. A solution according to claim 1 wherein the copolymer is a random copolymer of ethylene and acrylic acid.

3. A solution characterized in that a solute dissolved therein remains dissolved at substantially normal room temperature, said solution comprising a solvent blend of between about 55 and about 65 percent by weight toluene, based upon the total weight of the solvent blend, and between about 35 and about 45 percent by weight tetrahydrofuran, based upon the total weight of the solvent blend, and up to about 1 percent by weight, based upon the total weight of said solution, of a copolymer of between about 92 and about 99.5 percent by weight combined ethylene, based upon the total weight of the copolymer, and between about 0.5 and about 8 percent by weight combined acrylic acid, based upon the total weight of the copolymer.

4. A solution according to claim 3 wherein the copolymer is a random copolymer of ethylene and acrylic acid.

5. A solution according to claim 3 wherein the copolymer is a graft copolymer of ethylene and acrylic acid.

6. A solution according to claim 3 wherein the solvent blend comprises about 60 percent by weight toluene, based upon the total weight of the solvent blend, and about 40 percent by weight tetrahydrofuran, based upon the total weight of the solvent blend, and the copolymer contains about 92 percent by weight combined ethylene, based upon the total weight of the copolymer, and about 8 percent by weight combined acrylic acid, based upon the total weight of the copolymer.

References Cited

UNITED STATES PATENTS

| | | | |
|---|---|---|---|
| 3,177,269 | 4/1965 | Nowak et al. | 260—878 |
| 3,364,187 | 1/1968 | Wiggill | 260—88.1 |
| 3,389,109 | 6/1968 | Harmon et al. | 260—30.4 |

MORRIS LIEBMAN, Primary Examiner

H. H. FLETCHER, Assistant Examiner

U.S. Cl. X.R.

11—88.1; 260—33.6